United States Patent
Cheng et al.

(10) Patent No.: US 7,100,936 B1
(45) Date of Patent: Sep. 5, 2006

(54) UNIVERSAL MOTOR VEHICLE TRAILER HITCH

(76) Inventors: John C. Cheng, 768 S. Turnbull Canyon Rd., City of Industry, CA (US) 91745; Zhen Quin Huang, 768 S. Turnbull Canyon Rd., City of Industry, CA (US) 91745; Sam Fu, 768 S. Turnbull Canyon Rd., City of Industry, CA (US) 91745

( * ) Notice: Subject to any disclaimer, the term of this patent is extended or adjusted under 35 U.S.C. 154(b) by 0 days.

(21) Appl. No.: 11/010,143

(22) Filed: Dec. 13, 2004

(51) Int. Cl.
*B60D 1/52* (2006.01)
*B60D 1/00* (2006.01)

(52) U.S. Cl. .................................. 280/495; 280/491.5
(58) Field of Classification Search ................ 280/495, 280/491.5
See application file for complete search history.

(56) References Cited

U.S. PATENT DOCUMENTS

| | | | | | |
|---|---|---|---|---|---|
| 3,463,514 A | * | 8/1969 | Warner | ........................ | 280/495 |
| 3,768,837 A | * | 10/1973 | Reese | ........................ | 280/495 |
| 4,032,170 A | * | 6/1977 | Wood | ........................ | 280/495 |
| 5,149,122 A | * | 9/1992 | Helber | ..................... | 280/491.2 |
| 5,507,515 A | * | 4/1996 | Schellenberg et al. | ... | 280/491.5 |
| 5,511,813 A | * | 4/1996 | Kravitz | ........................ | 280/495 |
| 6,742,799 B1 | * | 6/2004 | Hansen | ....................... | 280/495 |
| 2003/0197348 A1 | * | 10/2003 | McCoy et al. | ........... | 280/491.5 |

* cited by examiner

*Primary Examiner*—Kevin Hurley
(74) *Attorney, Agent, or Firm*—Albert O. Cota

(57) ABSTRACT

A trailer hitch (20) for attachment onto a motor vehicle for pulling a trailer. The hitch (20) consists of a pair of forward and aft mounting brackets (22 and 24) that are connected into existing holes in the vehicle's frame. Each mounting bracket has flanges (22' and 24') with the aft brackets (24) having thru-holes (26) arranged in a bolt circle array. The pair of forward mounting brackets (22) are connected to the aft mounting brackets (24) for length adjustment of the trailer hitch relative to the hitch position on the motor vehicle. The height of the trailer hitch (20) is regulated by the right side up or upside down position of the aft mounting brackets (24) properly orienting the thru-holes. A box hitch (44) is adjustably attached for width regulation onto the thru-holes of the aft mounting brackets (24) by inserting arms (30) into a tubular sleeve (50) of the box hitch at an appropriate distance. A receiver box (48) is connected on the bottom of the tubular sleeve for receiving a hitch ball mounted on a trailer ball mount.

18 Claims, 7 Drawing Sheets

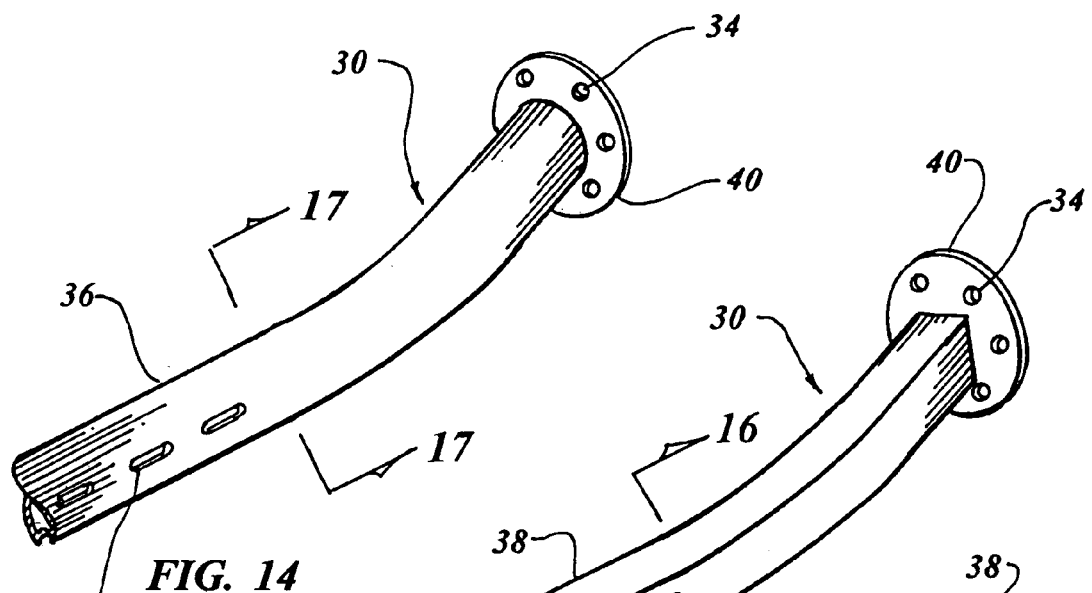
*FIG. 14*  *FIG. 15*  *FIG. 16*
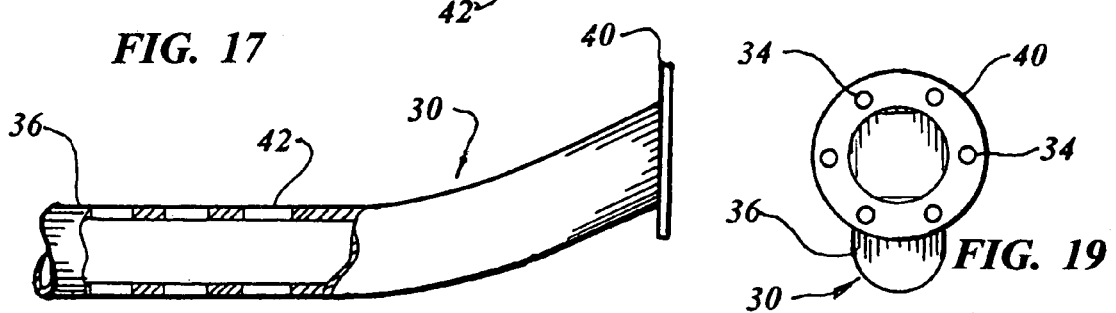
*FIG. 17*  *FIG. 18*  *FIG. 19*
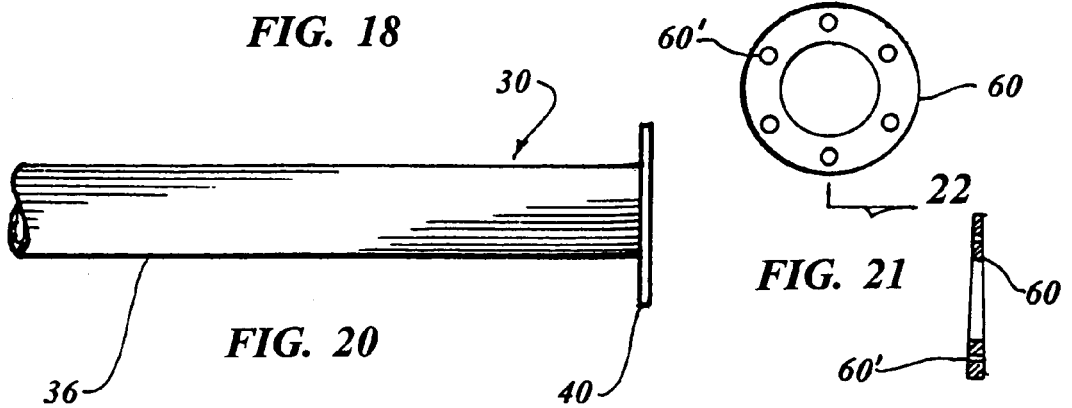
*FIG. 20*  *FIG. 21*  *FIG. 22*

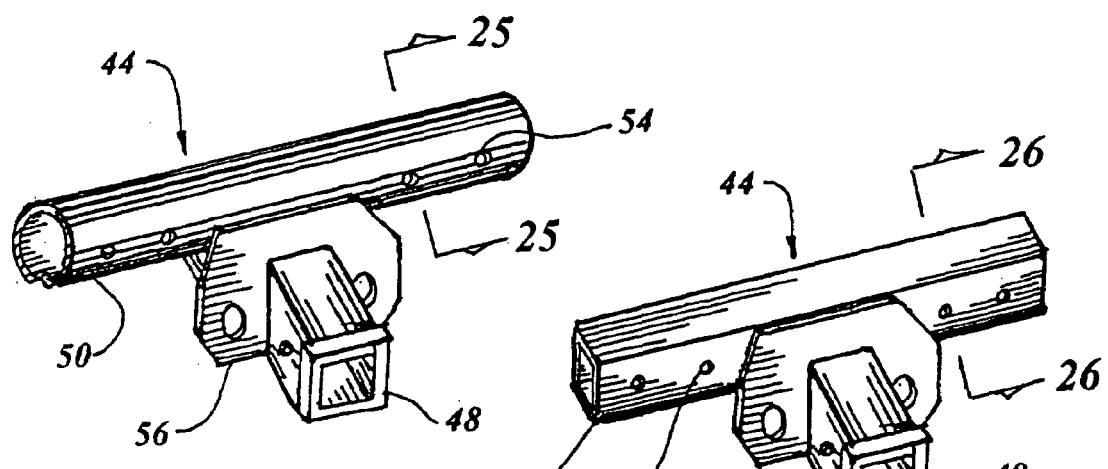
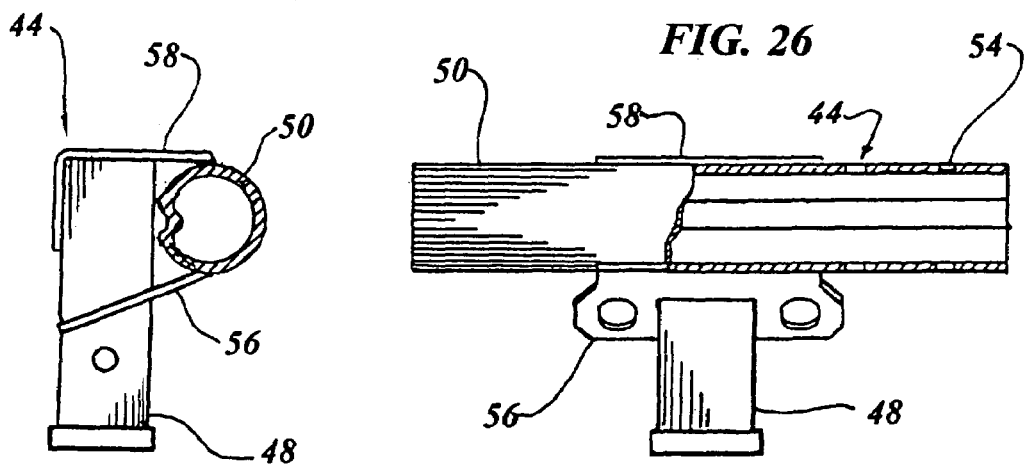
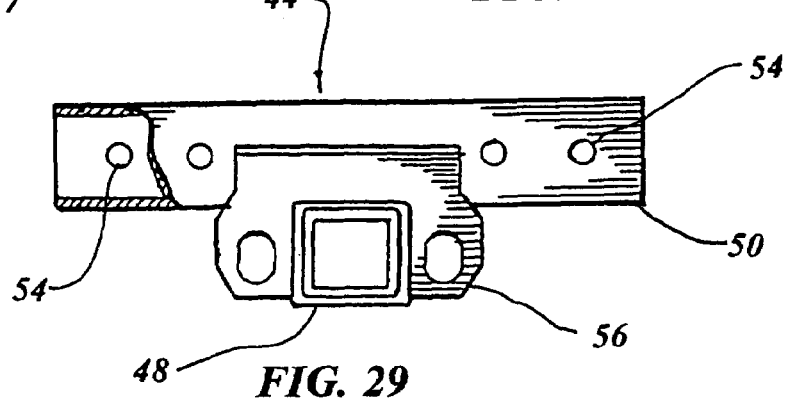

UNIVERSAL MOTOR VEHICLE TRAILER HITCH

TECHNICAL FIELD

The invention generally pertains to receiver hitches for motor vehicles, and more specifically to a trailer towing receiver hitch that is universally adjustable in length, width and height.

BACKGROUND ART

Previously, many types of receiver hitches have been used to provide an effective means for attaching a trailer using a ball mount and hitch ball onto a conventional pick up truck or other similar vehicle.

The prior art listed below did not disclose patents that possess any of the novelty of the instant invention; however the following U.S. patents are considered related:

| U.S. Pat. Number | Inventor | Issue Date |
| --- | --- | --- |
| 5,149,122 | Helber | Sep. 22, 1992 |
| 5,620,198 | Borchers | Apr. 15, 1997 |
| 5,873,594 | Mc Coy et al. | Feb. 23, 1999 |
| 6,139,042 | Tetrick | Oct. 31. 2000 |
| 6,173,984 | Kay | Jan. 16, 2001 |
| 6,578,864 | Mc Coy et al. | Jun. 17, 2003 |
| 6,601,868 | Mc Coy et al. | Aug. 5, 2003 |

U.S. Pat. No. 5,149,122 discloses an adjustable hitch assembly with a receiver unit slideably engaged with connector arms. The connector arms are in turn slideably engaged with a vertical attachment post by means of a coupler that enables the hitch to be adjusted in three dimensions. Readjustment is accomplished with fasteners attaching the assembly together. Preformed hole patterns in a set of flanges and an arm of the connector accommodate standard hole patterns in the vehicle frame rails fitting most commercially available vehicles.

U.S. Pat. No. 5,620,198 discloses a protective collar for installation on a receiver box and a trailer hitch receiver for a vehicle. The trailer hitch receiver has a central frame member and vehicle mounting brackets. The receiver box is mounted to the frame member and includes a cavity adapted to receive a hitch bar.

U.S. Pat. No. 5,873,594 discloses is for a hitch bar for a trailer hitch assembly formed from an elongated bar with a notched proximal end and a mounting rack carried on the distal end. The notch reduces the stiffness of the elongated bar, thereby allowing the bar to deflect and absorb a portion of the reaction load and redistributes the load in the hitch box.

U.S. Pat. No. 6,139,042 discloses a carrier frame for a spring cushion truck hitch. The frame includes side mounting brackets and a transverse load-resisting bar connected between the mounting brackets. The carrier frame can be removed from the hitch and the hitch re-used in a truck having a different configuration.

U.S. Pat. No. 6,173,984 discloses a hitch having a frame with transversely extending tubular structural members forming a dual tow bar receiver with mating dual towbar inserts.

U.S. Pat. No. 6,578,864 discloses a trailer hitch receiver which consists of a main frame member, a hitch receiver box carried on the main frame member, and a pair of opposed mounting brackets. Each of the brackets contains a series of apertures for securing the mounting brackets to the main frame that is defined in two separate positions that share a set common of holes. The mounting brackets may be mounted in an inboard or outboard position for a particular application.

U.S. Pat. No. 6,601,868 discloses a continuation of the above listed U.S. Pat. No. 6,578,864 which is basically the same with the addition of method claims including the same construction processes as the apparatus claims.

DISCLOSURE OF THE INVENTION

The field of hitch assemblies has been developed to permit aftermarket attachment of trailer tow hitches for use with pick-up trucks or other similar vehicles, since many times an original equipment manufacture does not furnish the provisions for towing trailers with the vehicles. Therefore, many businesses have been developed to fill the need of such a hitch assembly, particularly for the common, class III application. As there is no industry standard mounting provision on a vehicle frame rail, along with the trailer towing tongue height, considerable development has been accomplished to fill this need. There is no universal device that has been developed that accomplishes all of the purposes relative to the position of vehicle components such as exhaust systems, spare tire mounting, etc.

The present invention overcomes the problem of positioning and spacing, which is the primary object of the invention. The inventive universal motor vehicle trailer hitch combines length, width and height adjustment in a robust and secure manner. Width spacing between the vehicle frame rails is accomplished by utilizing a telescoping arrangement, with a pair of hitch mounting arms telescoping into a box hitch which employs either embodiment of a round tube or a square tube. The length adjustment from the rear of the vehicle is accomplished by changing a connection interface located between forward and aft mounting frame brackets. Therefore, different manufacturers and models of motor vehicles may be accommodated by the universal motor vehicle trailer hitch. The height adjustment is accomplished by providing thru-holes arranged in a bolt circle pattern in the aft mounting frame brackets by turning the aft brackets upside down, and reversing sides, the bolt circle pattern is relocated relative to its height. The hitch mounting arms include a round mounting plate having the same bolt pattern, thus permitting the mounting arms to be attached to the appropriate locations relative to their height. The thru-holes are positioned at a convenient location to accommodate the most common requirements.

An almost equally important object of the invention is that the receiver hitch assembly may be packaged in a relatively small container. While this object may not appear to be an important advantage, it has been found that retail stores have limited space for display, particularly when a product is heavy and was previously lengthy since the main frame member in the most commonly sold products are in one piece. By designing the arms and box hitch in three separate pieces, and the brackets in two separate pairs, the container is considerably smaller, even to the extent that existing shelving can hold two assemblies in the place of one. In cases known to the inventor, many retail outlets only restock the shelves at night when the store is closed. Therefore, if a single item is sold during the day it is not replaced until the next day, eliminating the sales potential to a single unit per day, whereas turnover of the hitch may be doubled by the simple reduction in the packaging size.

Another object of the invention is the strength of the attachment between the arms and the frame mounting brackets. Prior art has attempted to provide depth adjustment by having a series of holes in an evenly spaced array in the frame brackets and by using a pair of mating holes in the arm mounting flanges, either in common holes or two diagonal holes to achieve the depth adjustment. The present invention uses thru-holes arranged in a bolt circle which places the shear strength of the fasteners in the most ideal position relative to the forces created by a tongue weight and the shock and vibration of over the road transportation.

Yet another object of the invention is that the adjustment of the width is not only secured with a plurality of bolts and nuts that hold the arms that telescope into the box hitch securely, but also with at least two clinching bolts with locking nuts that are located in threaded holes in the bottom portion of the box hitch sleeve. The clinching bolts with their accompanying locking nuts force the top of the arms to embrace the upper inner surface of the box hitch sleeve. The inclusion of this securement eliminates any rattle or chatter between the elements when the invention is subjected to the shock and vibration that accompanies over the road operation.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 14 is a partial isometric view of one of the hitch mounting arms in the round tubular steel body of the preferred embodiment.

FIG. 15 is a partial isometric view of one of the hitch mounting arms in the square tubular steel body variations of the preferred embodiment.

FIG. 16 is a cross-sectional view taken along lines 16—16 of FIG. 15.

FIG. 17 is a cross-sectional view taken along lines 17—17 of FIG. 14.

FIG. 18 is a cutaway partial top plan view of one of the hitch mounting arms in the round tubular steel body embodiment.

FIG. 19 is right end view of one of the hitch mounting arms in the round tubular steel body embodiment.

FIG. 20 is a partial side view of one of the hitch mounting arms in the square tubular steel body embodiment.

FIG. 21 is front view of an optional wedged shaped adapter plate.

FIG. 22 is a cross-sectional view taken along lines 22—22 of FIG. 21.

FIG. 23 is a partial isometric view of the box hitch in the round tubular steel body of the preferred embodiment.

FIG. 24 is a partial isometric view of the box hitch in the square tubular steel body variations of the preferred embodiment.

FIG. 25 is a cross-sectional view taken along lines 25—25 of FIG. 23.

FIG. 26 is a cross-sectional view taken along lines 26—26 of FIG. 24.

FIG. 27 is left side view of the box hitch in the round tubular steel embodiment.

FIG. 28 is a cutaway top plan view of the box hitch in the round tubular steel embodiment.

FIG. 29 is cutaway front view of the box hitch in the round tubular steel embodiment.

BEST MODE FOR CARRYING OUT THE INVENTION

Figure 1:
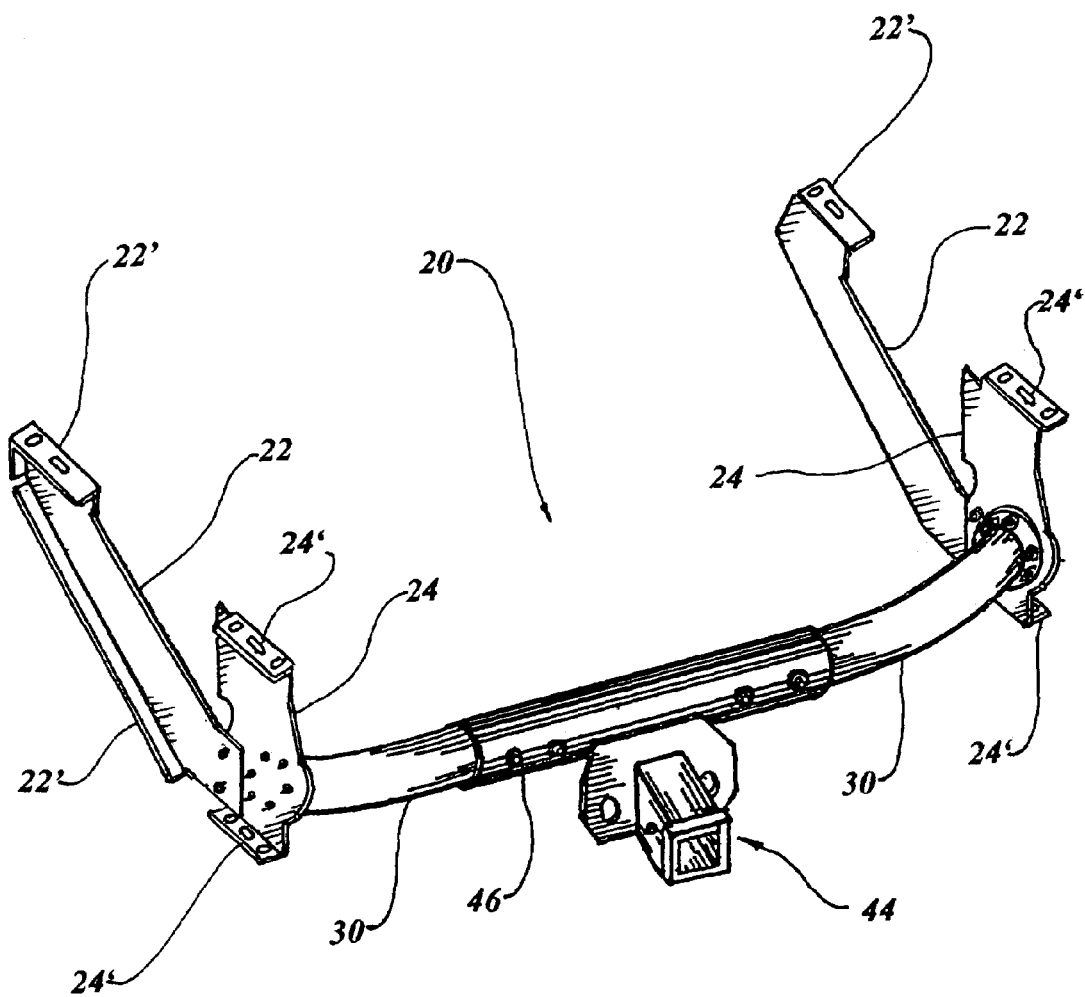
FIG. 1 is a partial isometric view of the universal trailer hitch in the preferred embodiment.

The best mode for carrying out the invention is presented in terms of a preferred embodiment for a universal motor vehicle receiver hitch 20 that is utilized to receive a trailer ball mount having a hitch ball mounted thereon. The hitch 20 is attached onto the frame rails of a motor vehicle used in pulling a trailer. The preferred embodiment of the receiver hitch 20, as shown in FIGS. 1 through 30, is comprised of a pair of forward frame mounting brackets 22 and a pair of aft mounting brackets 24. The brackets 22 and 24 are attached to each other at a chosen interface, thus forming a preselected length for mounting onto the frame rails of a motor vehicle, such as a pick-up truck.

Each forward mounting bracket 22 and aft mounting bracket 24 includes at least one flange 22' and 24' respectively on a top and a bottom surface which are used for attaching to the frame of a motor vehicle and for stiffening purposes. The brackets 22 and 24 are illustrated in FIGS. 1–13 and 30, with the top flanges 22' and 24' having a plurality of mounting slots that mate with corresponding holes that are provided by the original equipment manufacturer in the motor vehicle frame.

Figure 5:
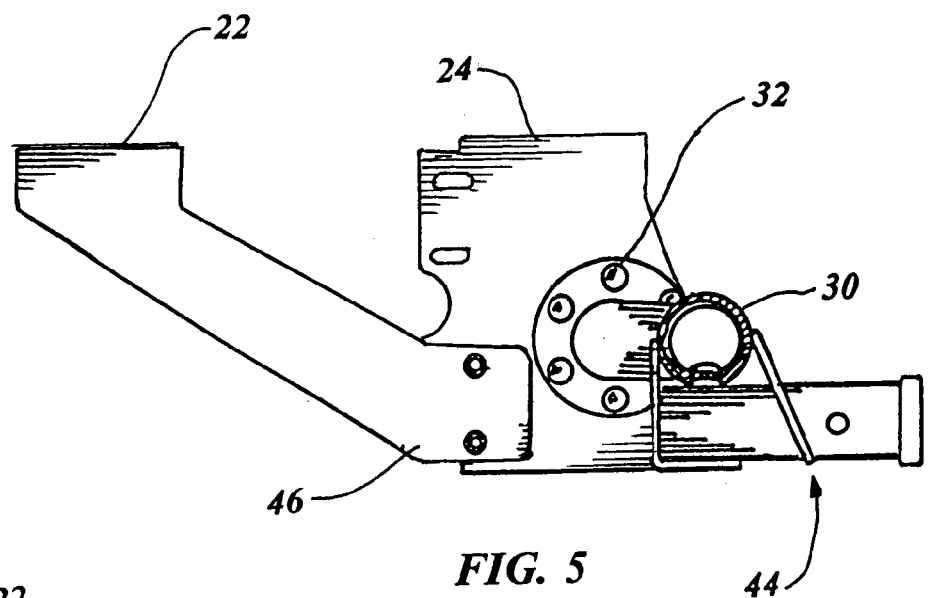
FIG. 5 is a cross-sectional view taken along lines 5—5 of FIG. 2 with the forward and aft mounting brackets connected together at their minimum overall length and the aft mounting bracket having the hitch mounting arms connected at the lower position.
Figure 6:
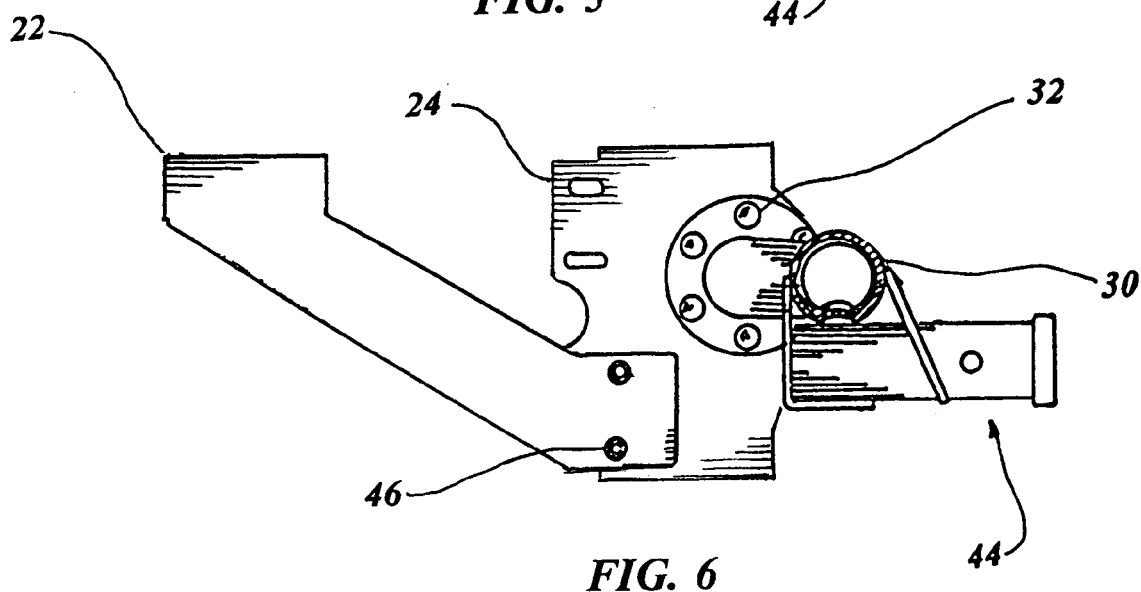
FIG. 6 is a cross-sectional view taken along lines 6—6 of FIG. 2 with the forward and aft mounting brackets connected together at their minimum overall length and the aft mounting bracket having the hitch mounting arms connected at the upper position by interchanging and reversing the aft mounting brackets from right side up to upside down.
Figure 7:
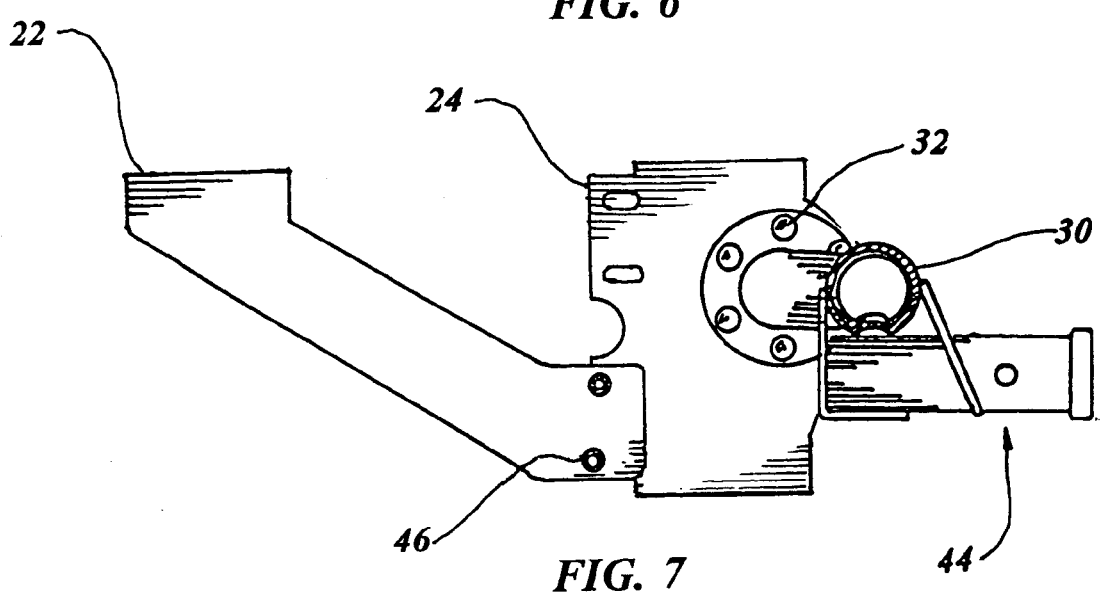
FIG. 7 is a cross-sectional view taken along lines 7—7 of FIG. 2 with the forward and aft mounting brackets connected together with the maximum overall length and the aft mounting bracket having the hitch mounting arms connected at their upper position.
Figure 8:
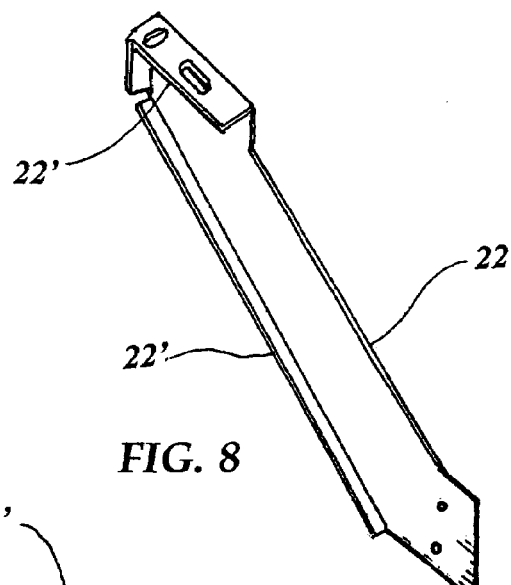
FIG. 8 is a partial isometric view of one of the forward mounting brackets completely removed from the invention for clarity.
Figure 9:
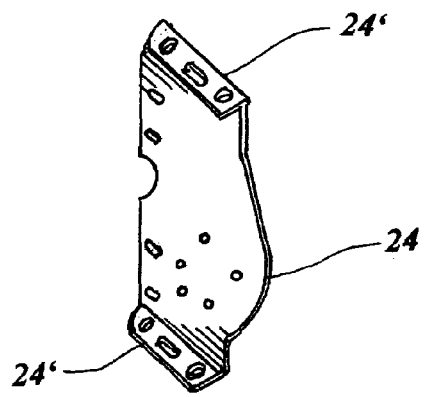
FIG. 9 is a partial isometric view of one of the aft mounting brackets completely removed from the invention for clarity.
Figure 10:
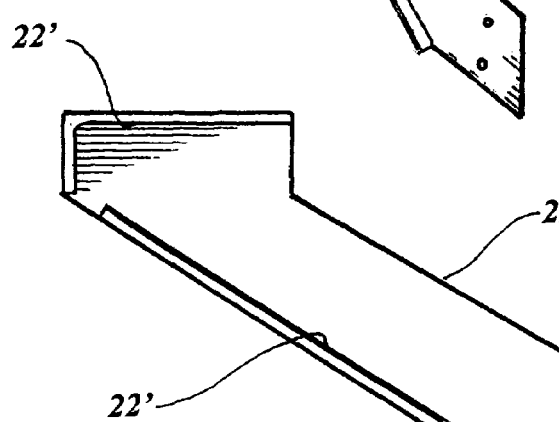
FIG. 10 is a side view of one of the forward mounting brackets completely removed from the invention for clarity.
Figure 11:
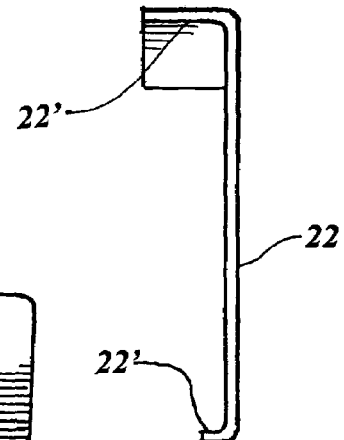
FIG. 11 is an end view of one of the forward mounting brackets completely removed from the invention for clarity.
Figure 12:
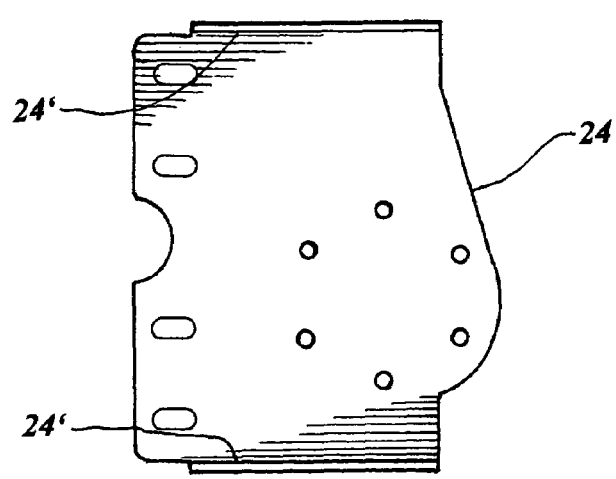
FIG. 12 is a side view of one of the aft mounting brackets completely removed from the invention for clarity.
Figure 13:
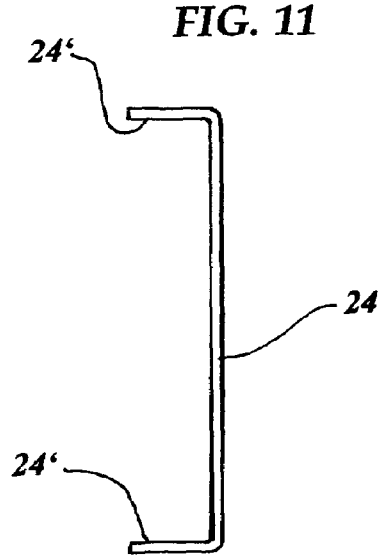
FIG. 13 is an end view of one of the aft mounting brackets completely removed from the invention for clarity.
Figure 30:
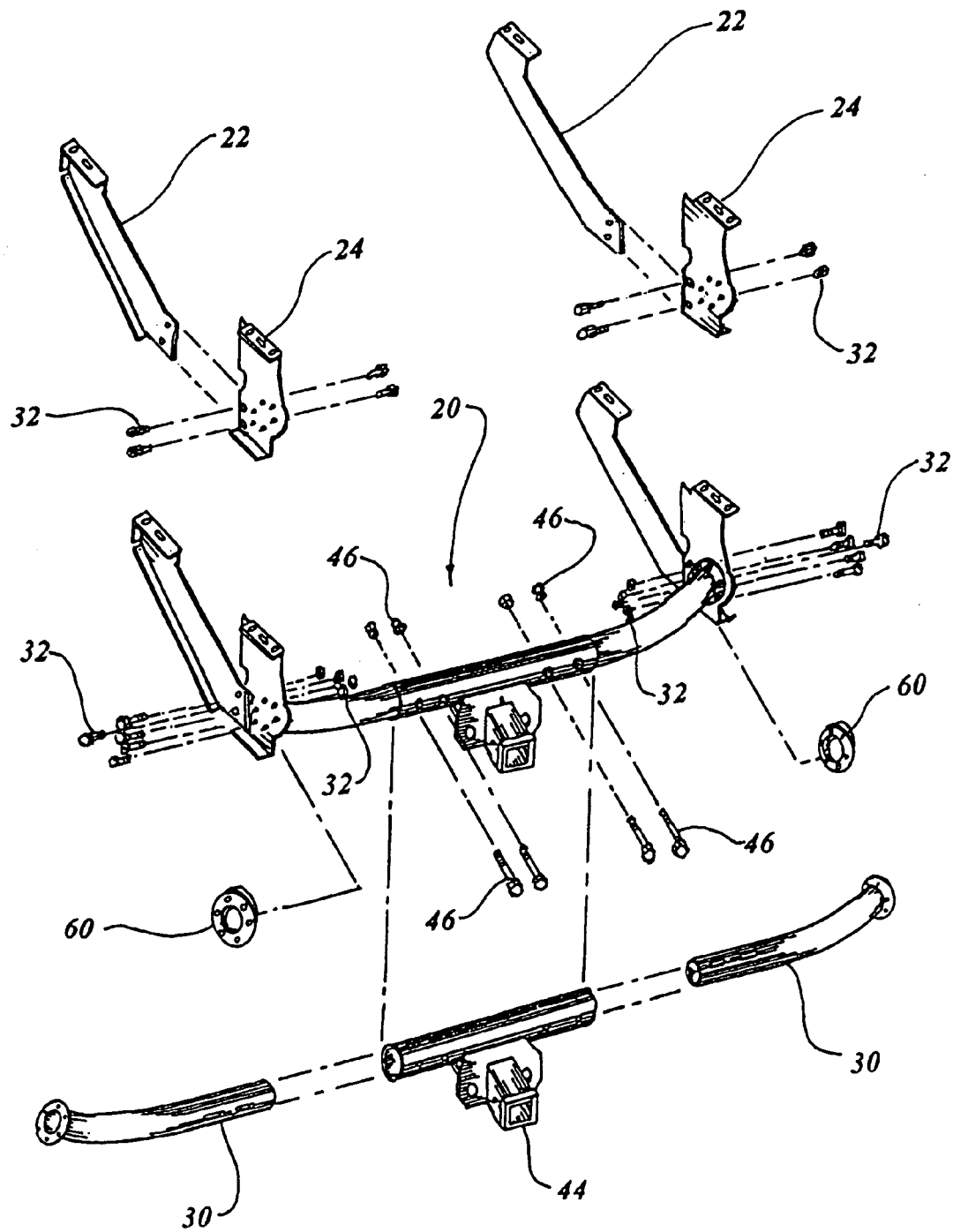
FIG. 30 is an exploded view of the universal receiver hitch.

Each aft mounting bracket 24 includes a single set of bracket thru-holes 26 that are arranged in a bolt circle and are used for attachment purposes. Threaded fasteners 32 in the form of a plurality of bolts and nuts attach the aft mounting brackets 24 onto each forward mounting bracket 22 within the appropriate holes and slots for length adjustment, as shown in FIGS. 5–7.

Figure 2:
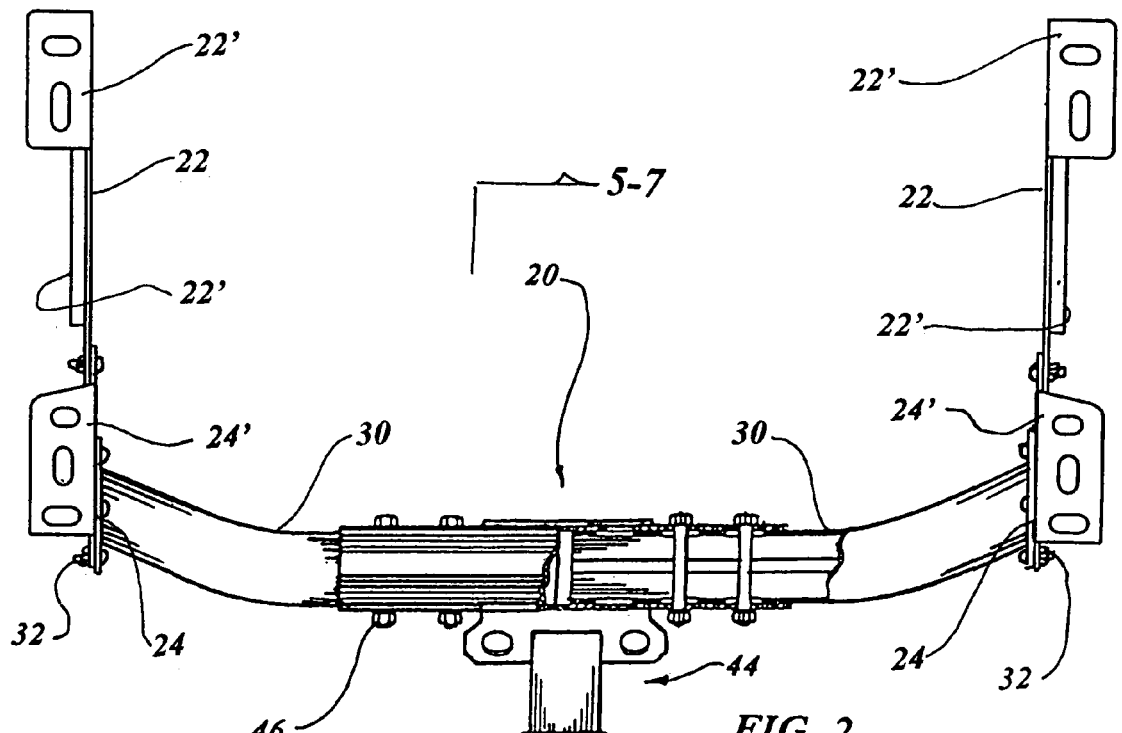
FIG. 2 is a plan view of the universal trailer hitch in the preferred embodiment with the hitch mounting arms in the minimum length position.
Figure 3:
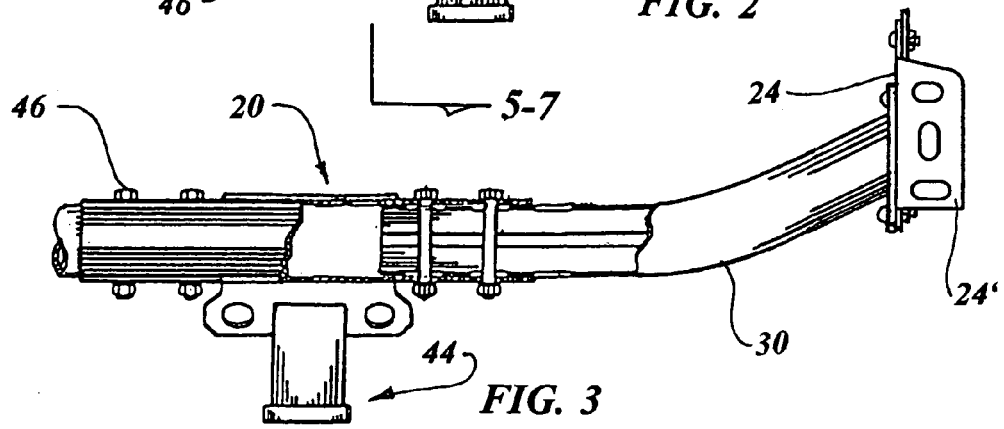
FIG. 3 is a fragmentary plan view of the universal trailer hitch in the preferred embodiment with the hitch mounting arms in the maximum length position.
Figure 4:
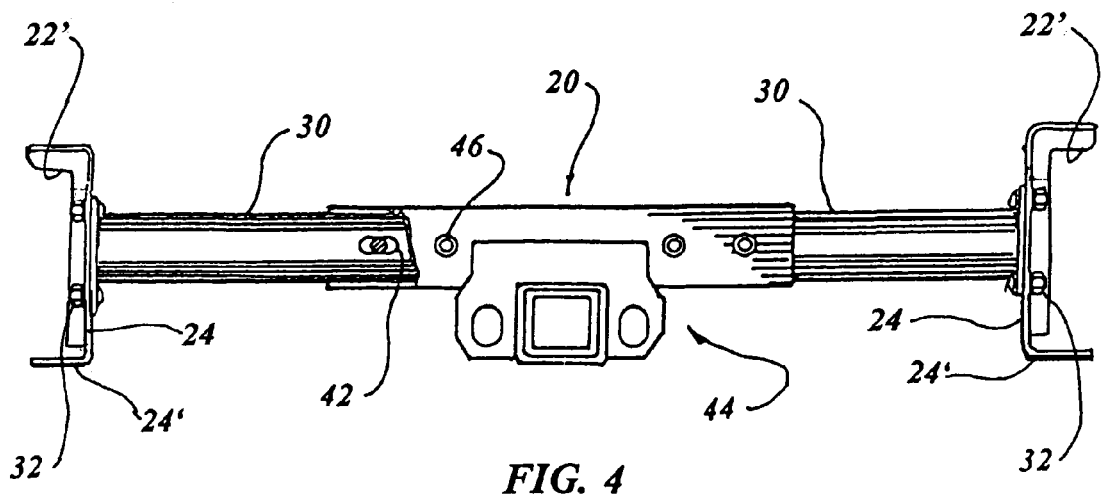
FIG. 4 is a front view of the universal trailer hitch in the preferred embodiment.

A hitch mounting arm 30 is connected to each aft mounting bracket 24, with threaded fasteners 32 interfacing with arm thru-holes 34 in a bolt circle array on the aft mounting bracket 24 for height adjustment of the receiver hitch 20 relative to a motor vehicle frame. The threaded fasteners 32 that attach the mounting arms 30 to the aft bracket 24 are preferably bolts and nuts, as illustrated in FIGS. 1–7 and 29. In order to have the bracket thru-holes 26 on the aft mounting bracket 24 at the proper height orientation, the brackets 24 may be installed in a right side up position, as shown in FIGS. 1, 4 and 5, or an upside down position, as shown in FIGS. 6 and 7. In order to have the flanges 24' facing the proper direction the brackets 24 are transposed from side to side when relocating from the right side up position.

The hitch mounting arms 30 consist optionally of either a round tubular steel body 36 having an indexing groove 36' formed therein, as shown in FIGS. 14, 17, 18 and 19, or a square tubular steel body 38, as shown in FIGS. 15, 16 and 20. In either case, a round mounting plate 40 is permanently attached to the body 36 or 38 on their first end as shown. The round mounting plate 40 contains the plurality of arm thru-holes 34 that are arranged in a bolt circle and mate with the bracket thru-holes 26 in the brackets 24. The round tubular steel body 36 and the square tubular steel body 38, have a plurality of arm attaching slots 42 therethrough that are positioned adjacent to the second end of the body 36 or 38.

To complete the adjustable receiver hitch 20 the two hitch mounting arms 30 are adjustably inserted into a box hitch 44 on a second end and secured with mounting hardware 46. The box hitch 44 includes a receiver box 48 that is connected under the box hitch 44 in a permanent manner such as a weld joint and is used for receiving a hitch ball mounted on a trailer ball mount (not shown as it is not part of the invention). The box hitch 44 consists of either a round tubular sleeve 50 having an indexing groove 50' formed therein, as shown in FIGS. 23, 25 and 27–29, or a square tubular sleeve 52, as shown in FIGS. 24 and 26. In either case, a plurality of apertures 54 are positioned adjacent to each sleeve 50 or 52 distal end and a plurality of threaded holes 54' are located through the underside of the sleeve 50 or 52.

The mounting hardware 46 for attaching the arms 30 to the box hitch round or square tubular sleeve 50 or 52 consists of a plurality of bolts and nuts. The bolts and nuts are mated with a common selection of apertures 54, and the arm attaching slots 42 form the receiver hitch width adjustment, as shown in FIGS. 2, 3 and 18. A plurality of clinching bolts with locking nuts 46' are attached to the threaded holes for snugging the arms 30 in the box hitch sleeve 50 or 52.

A chain plate gusset 56 is permanently attached between the box hitch round or square tubular sleeve 50 and 52 onto a square tube receiver box 48. An angle stiffener 58 is also permanently attached onto the box hitch 44 and the round or square tubular sleeve 50 and 52 for structural reinforcement. The attachment and location of the chain plate gusset 56 and the angle stiffener 58 is shown best in FIGS. 23, 24 and 27–29.

Since some pick-up trucks have a main frame that is angled rather than parallel, a plurality of wedge shaped adapter plates 60 are furnished with the adjustable receiver hitch 20, particularly when used on Ford trucks. The wedge shaped adapter plate 60, as shown in FIGS. 21 and 22, includes a plurality of adapter thru-holes 62 that are arranged in a bolt circle corresponding to the bracket thru-holes 26 and the arm thru-holes 34, thereby permitting the adjustable receiver hitch 20 to be mounted to a motor vehicle with an angularly tapered frame.

While the invention has been described in detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A universal trailer hitch for a motor vehicle which comprises:
    a) a pair of forward mounting brackets,
    b) a pair of aft mounting brackets attached to each forward mounting bracket at a selected interface, thus forming a preselected length for mounting onto a motor vehicle frame,
    c) a pair of hitch mounting arms attached with fasteners to each mating aft mounting bracket oriented according to the selected motor vehicle height requirement, and
    d) a box hitch having said hitch mounting arms inserted into the box hitch in a telescoping manner and attached with mounting hardware at a depth with the combined length of the mounting arms and box hitch corresponding to a width between selected motor vehicle frame rails, wherein said box hitch having a receiver box connected thereunder for receiving a hitch ball mounted on a trailer ball mount.

2. The universal trailer hitch as recited in claim 1 wherein said aft frame mounting bracket orientation further comprises a right side up position.

3. The universal trailer hitch as recited in claim 2 wherein said aft frame mounting bracket orientation further comprises an upside down position that is transposed side to side from each aft mounting bracket right side up position.

4. The universal trailer hitch as recited in claim 1 wherein each forward mounting bracket and aft mounting bracket further comprise at least one flange on a top surface and at least one flange on a bottom surface for attaching to a frame of a motor vehicle and stiffening purposes.

5. The universal trailer hitch as recited in claim 1 wherein each aft mounting bracket further comprises a single set of thru-holes arranged in a bolt circle for attachment of the hitch mounting arms to each aft mounting bracket.

6. The universal trailer hitch as recited in claim 1 wherein said fasteners attaching said arms to said aft mounting brackets further comprise a plurality of threaded fasteners, defined as bolts and nuts and a plurality of bolts and nuts attach each aft mounting bracket to each forward mounting bracket.

7. The universal trailer hitch as recited in claim 1 wherein each hitch mounting arm further comprises a round tubular steel body having a first end and a second end, and a round mounting plate permanently attached to the steel body first end, said round mounting plate having a plurality of arm thru-holes arranged in a bolt circle and mating with each aft mounting bracket.

8. The universal trailer hitch as recited in claim 7 wherein said round tubular steel body having an indexing groove formed therein.

9. The universal trailer hitch as recited in claim 7 wherein said round tubular steel body having a plurality of arm attaching slots therethrough positioned adjacent to said second end.

10. The universal trailer hitch as recited in claim 1 wherein each hitch mounting arm further comprises a square tubular steel body having a first end and a second end, and a round mounting plate permanently attached to the first end, wherein said round mounting plate having a plurality of arm thru-holes arranged in a bolt circle mating with the bracket thru holes.

11. The universal trailer hitch as recited in claim 10 wherein said square tubular steel body having a plurality of arm attaching slots therethrough positioned adjacent to said second end.

12. The universal trailer hitch as recited in claim 1 wherein said box hitch further comprises a round tubular sleeve having an indexing groove formed therein, a plurality of apertures adjacent to each distal end, and a plurality of threaded holes in a bottom portion of said sleeve.

13. The universal trailer hitch as recited in claim 12 wherein said mounting hardware for attaching said arms to said box hitch further comprises a plurality of bolts and nuts mated with a common selection of apertures, with the arm attaching slots forming the receiver hitch width adjustment, further said round tubular sleeve having a plurality of clinching bolts with locking nuts attached to said threaded holes for snugging the arms in the box hitch sleeve.

14. The universal trailer hitch as recited in claim 13 further comprising a chain plate gusset permanently attached between the box hitch round tubular sleeve and the receiver box, and an angle stiffener attached jointly onto the box hitch and the round tubular sleeve for structural reinforcement.

15. The universal trailer hitch as recited in claim 1 wherein said box hitch further comprises a square tubular sleeve having a plurality of apertures adjacent to each distal end, and a plurality of threaded holes in a bottom portion of said sleeve.

16. The universal trailer hitch as recited in claim 15 wherein said mounting hardware for attaching said arms to said box hitch further comprises a plurality of bolts and nuts mated with a common selection of apertures, with the arm attaching slots forming the receiver hitch width adjustment, further said square tubular sleeve having a plurality of clinching bolts with locking nuts attached to said threaded holes for snugging the arms in the box hitch sleeve.

17. The universal trailer hitch as recited in claim 15 further comprising a chain plate gusset permanently attached between the box hitch square tubular sleeve and the receiver box also an angle stiffener attached onto the box hitch and the square tubular sleeve for structural reinforcement.

18. The universal trailer hitch as recited in claim 1 further comprising a wedge shaped adapter plate having a plurality of adapter thru-holes arranged in a bolt circle, thereby permitting the universal trailer hitch to be mounted to a motor vehicle having an angularly tapered frame.

* * * * *